US006996503B2

(12) United States Patent
Jung

(10) Patent No.: US 6,996,503 B2
(45) Date of Patent: Feb. 7, 2006

(54) SYSTEM AND METHOD FOR TAKE-OFF OF MATERIALS USING TWO-DIMENSIONAL CAD INTERFACE

(75) Inventor: Pyoung-Young Jung, Seoul (KR)

(73) Assignee: El-Con System Co., Ltd., Seoul (KR)

( * ) Notice: Subject to any disclaimer, the term of this patent is extended or adjusted under 35 U.S.C. 154(b) by 852 days.

(21) Appl. No.: 09/841,422

(22) Filed: Apr. 24, 2001

(65) Prior Publication Data

US 2001/0037190 A1    Nov. 1, 2001

(30) Foreign Application Priority Data

Apr. 27, 2000  (KR) ............................... 2000-22614
Sep. 30, 2000  (KR) ............................... 2000-57700
Sep. 30, 2000  (KR) ............................... 2000-57701

(51) Int. Cl.
    *G06F 17/50*    (2006.01)
(52) U.S. Cl. .................. 703/1; 703/6; 703/7; 717/135; 700/95
(58) Field of Classification Search .................... 703/1, 703/6, 7; 52/741.1; 717/135
    See application file for complete search history.

(56) References Cited

U.S. PATENT DOCUMENTS

| | | | | |
|---|---|---|---|---|
| 5,761,674 A | * | 6/1998 | Ito ........................... | 707/104.1 |
| 6,438,922 B1 | * | 8/2002 | DeLeFevre ................ | 52/741.1 |
| 6,618,856 B2 | * | 9/2003 | Coburn et al. ............. | 717/135 |
| 6,658,387 B2 | * | 12/2003 | Finney ....................... | 704/270 |
| 6,681,140 B1 | * | 1/2004 | Heil ........................... | 700/95 |
| 6,816,819 B1 | * | 11/2004 | Loveland .................... | 703/1 |
| 2002/0026343 A1 | * | 2/2002 | Duenke ...................... | 705/8 |
| 2003/0036891 A1 | * | 2/2003 | Aragones et al. .......... | 703/8 |

OTHER PUBLICATIONS

"On-Screen Takeoff 2.0", Press Release, On Center Software, Inc., Apr. 3, 2000.*
"e Takeoffs for ePlans in Excel", BidScreen XL, Product Description, Vertigraph Inc., 2000.*
Bidworx Takeoff and Estimating Software, Online Product Brochure, Vertigraph Inc. 1997.*
Patent Abstracts of Japan, vol. 1999, No. 11 & JP 11-165160 (Jun. 22, 1999), abstract.
Patent Abstracts of Japan, vol. 1999, No. 3 & JP 10-334135 (Dec. 18, 1998), abstract.
Patent Abstracts of Japan, vol. 200, No. 2 & JP 11-311023 (Nov. 9, 1999), abstract.

* cited by examiner

*Primary Examiner*—Jean R. Homere
*Assistant Examiner*—Fred Ferris
(74) *Attorney, Agent, or Firm*—Hamre, Schumann, Mueller & Larson, P.C.

(57) ABSTRACT

A system and method for taking-off material details using a two-dimensional CAD interface for estimating a bill of materials and automatically creating a material take-off list for items in a two or three-dimensional design drawing, without manual work. The taken-off list information is provided on-line upon receiving an order for an information provision service through a communication network, such as the internet. The system is applicable, for example, in architecture, civil engineering, machinery, and facilities. The system comprises: a project information containing unit for containing project information including position data, design specifications, and shape data for a variety of design items; a material/cost containing unit for containing material information and cost information for building elements included in a CAD drawing; and a bill-of-material take-off processing unit for creating a material take-off list and the associated cost.

2 Claims, 17 Drawing Sheets

FIG.4

```
1   (defun Room_xdata ( rm_list @bl @pto @han
2                   / ed xd rm_name_ rm_numb_ rm_finish_ rm_area_rm_cheig)
3     ( regapp "POINTS" )
4     ( setq rm_name_     (nth  0  rm_list)           ;1. ROOM NAME
5           rm_numb_      (nth  1  rm_list)           ;2. ROOM NUMBER
6           rm_finish_    (nth  2  rm_list)           ;3. FINISH NUMBER
7           rm_area_      (nth  3  rm_list)           ;4. AREA
8           rm_cheig_     (nth  4  rm_list)           ;5. CEILING HEIGHT
9     )
10    ( if ( = rm_finish_ "_") (setq rm_finish_ ""))
11    (setq xd (list-3 (list "POINTS"
12                     (cons 1000 rm_name_)           ;1. ROOM NAME
13                     (cons 1000 rm_numb_)           ;2. ROOM NUMBER
14                     (cons 1000 "")                 ;3. FLOOR INTERSECTION
15                     (cons 1000 rm_finish_)         ;4. FINISH NUMBER
16                     (cons 1000 rm_area_)           ;5. FLOOR AREA
17                     (cons 1000 "")                 ;6. HEIGHT OF SKIRTING BOARD
18                     (cons 1000 rm_cheig_)          ;7. CEILING HEIGHT
19                     (cons 1013 @pt0)               ;8. ROOM CODE xy COORDINATE(original point)
20                     (cons 1011 @pt0)               ;9. ROOM CODE xy COORDINATE
21                     (cons 1000 @han)               ;10. HANDLE
22                     (cons 1000 "")                 ;11. POSITION OF DRAWING
23                     (cons 1000 "")                 ;12. HANDLE VALUE OF ROOM-INTERSECTING POLYLINE
24    ) ) )
25    (setq ed (entget @bl))                          ;Entity list of block
26    (setq ed (append ed (list xd)) )                ;Update Entity list of block
27    (entmod ed)                                     ;Combine xdata POINT with entity list of block
28  ) ;DEFUN
```

FIG.5

| ROOM NUMBER : F10004 | | ROOM NAME : OFFICE-4 | | | | | |
|---|---|---|---|---|---|---|---|
| ROOM SHAPE AND PLANIMETER | BUILDING ELEMENT | ITEM NAME | SPECIFICATION | UNIT | QUANTITY | TAKE-OFF FORMULA | UNIT COST |
| ☐ ☐ ☐ 1/500 | WALL | | [sw-1]3.60=1.80x2.00 [ssw-1]1.98=1.80x1.10 | | | | ☐ |
| | | WATER-BASED PAINT | INNER WALL THREE TIMES | M2 | 37.55 | 19.57x2.70-(sw-1) | ☐ |
| | | CONCRETE SURFACE TREATING | INNER WALL | M2 | 37.55 | 19.57x2.70-(sw-1) | ☐ |
| ① ② 1/200 | FLOOR | CEMENT MORTAR | FLOOR 24MM | M2 | 22.42 | TA | ☐ |
| | | DELUXE TILE | 2.5x300x300 | M2 | 22.42 | TA | ☐ |
| | CEILING | AL MOLDING | | M | 19.57 | TL | |
| | | LIGHT-WEIGHT STEEL FRAME | M-BAR | M2 | 22.42 | TA | |

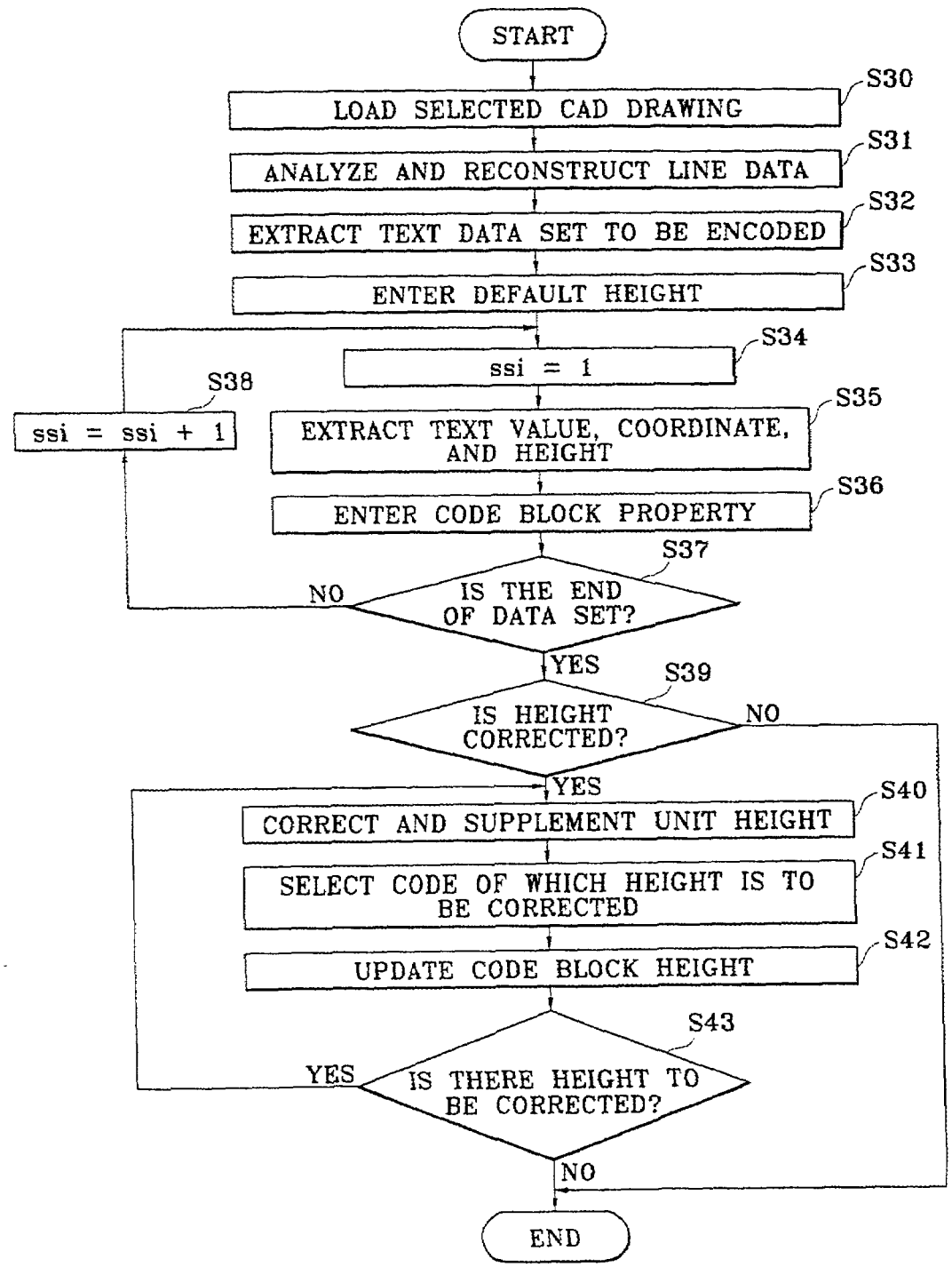

FIG.8b

SEND OUT RESOURCE | SEND OUT LOW PRICE

CODE TYPE

DISCRIMINATOR ☐ ENTER T IN DISCRIMINATING TAB KEY

STORE    CLOSE

---SELECT DATA TO BE STORED---

☐ CODE              ☐ ITEM NAME
☐ SPECIFICATION     ☐ UNIT
☐ UNIT COST1        ☐ UNIT COST2
☐ UNIT COST3        ☐ UNIT COST4
☐ UNIT COST5        ☐ UNIT COST6
☐ UNIT COST7        ☐ UNIT COST8
☐ USER UNIT COST

FIG.8c

| CONSTRUCTION TYPE MANAGEMENT | | |
|---|---|---|
| | DELETE SELECT UNDO | |
| CODE OF CONSTRUCTION TYPE | NAME OF CONSTRUCTION TYPE | |
| 1 | A | COMMON TEMPORARY WORK |
| 2 | B | TEMPORARY WORK |
| 3 | C | SOIL WORK |
| 4 | D | STEEL-REINFORCED CONCRETE |
| 5 | E | STEEL FRAMING |
| 6 | F | MASONRY CONSTRUCTION |
| 7 | G | WATERPROOF WORK |
| 8 | H | TILING |
| 9 | I | STONE WORK |
| 10 | J | WOOD WORK |
| 11 | K | METAL WORK |

ENTER NEW TYPE OF CONSTRUCTION

CODE OF CONSTRUCTION TYPE [ ]

NAME OF CONSTRUCTION TYPE [ ]

STORE

SYSTEM AND METHOD FOR TAKE-OFF OF MATERIALS USING TWO-DIMENSIONAL CAD INTERFACE

BACKGROUND OF THE INVENTION

Field of the Invention

The present invention relates to a system and method for the take-off of materials using a two-dimensional CAD interface, and more particularly, to a system and method for taking-off material details using a two-dimensional CAD interface which automatically creates a material take-off list including full detail of material and cost information for items stated in a two or three-dimensional design drawing, without manual work or transformation, and which provides the taken-off information on-line resulting from receiving an order for an information provision service for a two-dimensional CAD drawing through a communication network, such as the internet, and automatically executes the information about the take-off of the materials, details, and cost management.

Generally, in order to build, extend, or renovate a structure required for constructing, manufacturing, and producing a variety of buildings, structures, and fixtures, design drawings, such as structural drawings, architectural drawings, and facility drawings, are most necessary. For making such a design drawing, a CAD program constructed in a computer system is being used.

In addition, a person managing construction or manufacture is allowed to analyze information of interest contained in a plurality of design drawings based on design drawings created by the CAD program over a long period of time. A take-off list including the materials and associated costs can be generated for use as an estimate sheet. In the prior art, an operator manually enters output measures in a calculator-based program to thus output them, requiring re-analysis of a two-dimensional blueprint drawing.

However, in such a manual method, the operator must take off the material and cost information of interest for each part, while checking and comparing material information and numerical information for each item stated in a plurality of blueprint drawings. Thus, it takes a lot of time to manually measure and enter the numerical data of each design structure and shape of the drawing. If the operator makes an error due to carelessness during the manual work, a problem occurs. As a result, there are limitations on the objective verification and modification of both design job and construction job.

On the other hand, in prior art, in order to overcome this problem, a method for calculating a numerical value of materials by placing a blueprint drawing on a digitizer, and entering the numerical information of a two-dimensional drawing by typing or in the form of spread sheets has been adapted.

In addition, with the development of three-dimensional design and display techniques in recent times, a method for taking-off the material information, after transforming an entity of a two-dimensional drawing into a three-dimensional entity by a CAD program, or after completing a three-dimensional entity in a three-dimensional drawing using a three-dimensional CAD program at the beginning, has been developed and adapted.

However, in this prior art method for taking-off material information, since a bill of materials is taken off based on the information about the design drawing and the detailed take-off sheet, it is difficult for an operator at a construction site, or a process and cost manager to precisely know parts position information actually required. Thus, it is disadvantageous that reprocessing must be carried out in a self-understandable manner. In addition, in the case that a change in design occurs during construction work, it is not easy to compare, crosscheck, and modify both design job and construction job.

Resultantly, in the take-off materials method depending on manual work of the operator, if the design drawing is updated, further manual work has to be done because it is difficult to detect, modify, and change a corresponding part. Accordingly, an enormous waste of time and labor is occurred, and there is a possibility of omitting information and losing unity during the modifying process.

In addition, in the method for taking-off material data using a three-dimensional design drawing, it is difficult to implement functions of entering, modifying, and supplementing a three-dimensional entity as dedicated to a three-dimensional CAD from the viewpoint of practical use. For this reason, there are limitations on a user interface for reproducing a three-dimensional CAD system to an expert's level, and it is very difficult to share related information or combine individual working drawings so that a plurality of operators can perform a job in cooperation with one another.

On the other hand, at present, there is still no system capable of sharing and analyzing CAD information created in initial steps, although there exists an electronic file which is made by handling a design drawing using a CAD program. Therefore, it is made impossible to carry out physical movement between offices, or between teams, thus making mutual assistance and cooperation in design works difficult.

Moreover, at present, a management service method for managing the entire process from design of a drawing to construction and work according to supply of construction materials using a communication network, such as the internet, capable of sending and receiving multimedia information including character and image information in various forms has been suggested. By this method, when an operator directly takes off the material and cost information for a design drawing by means of manual work, and then delivers its detailed take-off sheet to a server of the management service in the form of e-mail, a constructor, material provider, and service provider appropriate for building specifications for the corresponding design drawing are linked with one another, thus enabling a more efficient construction job.

However, in this prior art management service method, even tough the efficiency of the construction is achieved by combining a constructor, material provider, and service provider appropriate for building specifications for the corresponding design drawing via an internet communication network, the operator still must take off a full list of the material and cost details for objects stated in the design drawing with manual work. Accordingly, it is difficult to improve the workability of the construction and efficiently carry out the construction.

SUMMARY OF THE INVENTION

It is, therefore, an object of the present invention to provide a system and method for the take-off of the materials using a two-dimensional CAD interface which automatically estimates a bill of materials and cost by analyzing items stated in a two or three-dimensional design drawing created by a CAD program and extracting position information for each item, and shape information and material information for each part.

It is another object of the present invention to provide a method for taking-off the material details using a two-dimensional CAD interface which is capable of easily applying a number of code systems for each building and construction project by comprehensively supporting a material code classification system which can be applied for each of the categories of construction, facilities, and manufacturing for the purpose of standardization.

It is still another object of the present invention to provide a method for taking-off material details using a two-dimensional CAD interface which is capable of providing a transmission service via a communication network by automatically analyzing and supplementing parts material and shape information, position information, and cost information for use in a bill of materials, detailed take-off sheet, process, and cost management for buildings and structures included in a predetermined design drawing.

To achieve the above objects, there is provided a system for taking-off the material details using a two-dimensional CAD interface in accordance with a first embodiment of the present invention, in a computer terminal having a CAD system for creating a variety of design items for architecture, civil engineering, machinery, and facilities in a CAD drawing, including: a project information containing unit for containing project information including position data, design specifications, and shape data for a variety of design items; a material/cost containing unit for containing material information and cost information for building elements included in a CAD drawing in which a variety of design items for a project are stated; and a bill-of-material take-off processing unit for estimating a full bill of materials and cost for an object by analyzing position information, shape information, and material information for building elements included in the CAD drawing created by the CAD system with reference to the project information of the project information containing unit and the material information and cost information of the material/-cost containing unit.

In addition, there is provided a method for taking-off material details using a two-dimensional CAD interface in accordance with a second embodiment of the present invention, including the steps of: registering a project for an object to be built, installed, and manufactured; searching for a material code system corresponding to the registered project from code systems contained in a database, and if the material code system does not exist, registering it as a new code system; selecting a material code by classifying the registered code system into certain types; copying the material code and related data into the registered project; and estimating a bill of materials for a CAD entity using the material code and related data copied according to the project.

In addition, there is provided a method for taking-off material details using a two-dimensional CAD interface in accordance with a third embodiment of the present invention, including the steps in which: a client's computer creates a CAD drawing according to a predetermined project; the client's computer connects to a web host server via a communication network to thus request an information provision service of building and construction information for the created CAD drawing design and transmit the corresponding design drawing; the web host server receives the design drawing, and take off shape and position information and bill of material, process, and cost information for the building and construction information based on material codes and cost information contained in the database upon receipt of the design drawing; and the web host server creates a detailed estimate sheet for the requested take-off information, and transmits the same to the client's computer having requested a information provision service via the communication network.

BRIEF DESCRIPTION OF THE DRAWINGS

The above objects, features and advantages of the present invention will become more apparent from the following detailed description when taken in conjunction with the accompanying drawings, in which:

FIG. 4 is a view illustrating one example of an entity data for each room created according to the execution of the function of the take-off of finishing materials as shown in FIGS. 3a through 3c, FIG. 5 is a view illustrating one example of a detail take-off sheet of the materials and cost taken-off according to the execution of the function of estimating a bill of finishing materials as shown in FIGS. 3a through 3c.

FIG. 7 is a flow chart explaining an operation for entering and correcting a height value of items stated in a two-dimensional CAD drawing in accordance with the first embodiment of the present invention;

FIGS. 8a through 8c are views illustrating one example of the driving of a program of a system for the take-off of the materials constructed which is standardized by interchanging code systems of various materials in a multi-direction in accordance with a second embodiment of the present invention;

DETAILED DESCRIPTION OF THE PREFERRED EMBODIMENT

A first embodiment of the present invention will now be described with reference to the accompanying drawings.

Figure 1:
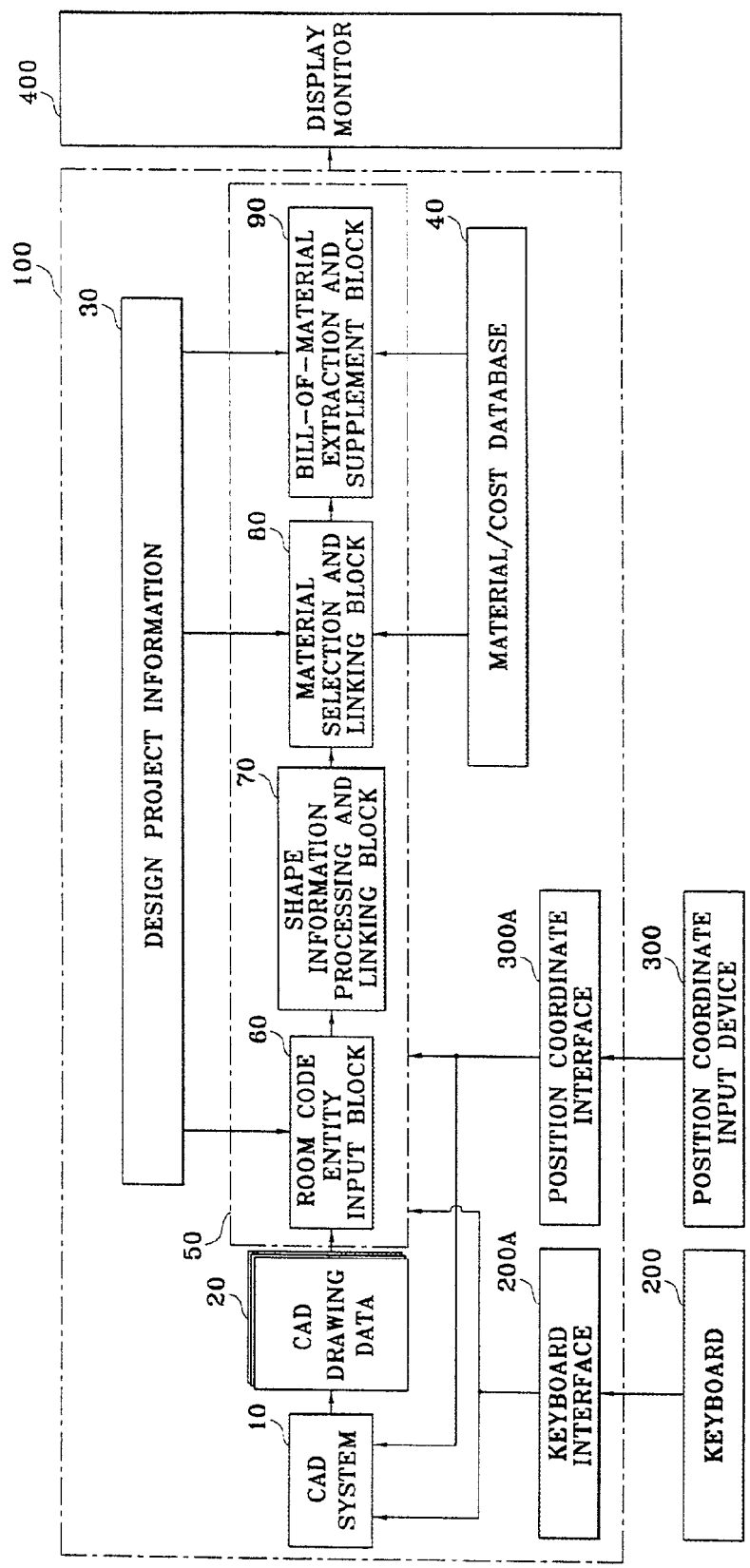
FIG. 1 is a block diagram illustrating the construction of a system for taking-off material details using a two-dimensional CAD interface in accordance with a first embodiment of the present invention.

That is, FIG. 1 is a block diagram illustrating the construction of a system for taking-off material data using a two-dimensional CAD interface in accordance with a first embodiment of the present invention.

As illustrated in FIG. 1, the system of the present invention includes: a computer body 100 having a two or three-dimensional CAD program for creating a design drawing in a two or three-dimension, and analyzing its two or three-dimensional CAD drawing, thus the take-off of the materials and cost; a keyboard 200 for entering a variable required for creating a two or three-dimensional CAD drawing; a position coordinate input device 300 for operating a program menu for creating a two or three-dimensional CAD drawing; and a display monitor 400 for visually displaying the process and results of creating a two or three-dimensional CAD drawing and the take-off list of the materials and cost.

The computer body 100 includes: a CAD system 10 having a two or three-dimensional CAD program for creating various design drawings in a two or tree-dimension; CAD drawing data 20 created by the CAD system 10 to be stored in a storage device, such as a hard disk drive; a design project information database 30 containing various design project information for the CAD drawing; a material/cost database 40 containing material codes, images, take-off formula information, and cost information for materials stated in the design drawing for a predetermined project; and a bill-of-material take-off processing engine 50 for taking-off material data and cost for each part of an object stated in the CAD drawing with reference to the data stored in the design project information database 30 and the material/cost database 40.

The CAD system 10 is provided with a CAD program and CAD library for creating a two or three-dimensional design drawing for various items to be built and manufactured in architecture or civil engineering. The CAD system 10 is a commonly employed CAD program, for example, "AutoCAD version 14" or "AutoCAD 2000", on which a 3rd parry program is operated.

The design project information database 30 contains information data included in various projects planned for constructing and manufacturing design items for a variety of buildings, engineering structures, facilities, and fixtures. In the design project information database 30, all particulars related to position information, design specifications, construction and shape information, etc. for a design object are arranged extensively, and an operator is allowed to preset a data and parameter value according to a predetermined project.

In addition, the material/cost database 40 contains individual material codes for all materials for design items for a variety of buildings, engineering structures, facilities, and fixtures. Composite material codes, cost for each material, images representing the color and texture of materials for each part, and take-off formula information are provided.

Here, in the material/-cost database 40, it is allowed to set material code and cost information for atypical data existing in the CAD drawing data 20, as well as typical data containing the composite material code and cost information set according to a predetermined project.

The bill-of-material take-off processing engine 50 takes off position information for each part and region of a design item included in buildings, engineering structures, machinery, facilities, and fixtures created based on the CAD drawing data 20 with reference to the project information contained in the design project information database 30, extracts shape information by calculating the length, area, height, and volume of a part or region having its position information with reference to code information for line data and surface data contained in the material/cost database 40, and takes off the materials and cost for each building element of an object which is calculated based on its shape information.

Here, the bill-of-material take-off processing engine 50 includes a room code entity input block 60, shape information processing and supplement block 70, material selection and linking block 80, and bill-of-material extraction and supplement block 90.

The room code entity input block 60 arranges names and name codes for each part and region of the CAD drawing 20, and corrects and supplements an irregular part of an entity of each drawing so as to extract a precise shape, with reference to the position information, design specifications, and construction and shape information included in the project information of the design project information database 30.

For example, in the case that the CAD drawing data 20 has a design drawing of a building, such as an apartment, the room code entity input block 60 analyzes the design drawing of the CAD drawing data 20 based on the project information, estimates position information by giving a room name and room number code to each room and automatically arranging them. Also, it corrects and enters a height value by entering the height value as a default, and by means of a user's input using the keyboard 200 or position coordinate input device 30.

In the bill-of-material take-off processing engine 50, the shape information processing and supplement block 70 corrects and supplements a room-intersecting line composed of dots and lines representing each room in order to automatically recognize a closed curve surrounding each room in the CAD drawing data 20. When such a room-intersecting reference line is completed, the cross point of the room-intersecting reference line is automatically recognized to thus forms a room-intersecting closed curve with center in the reference point coordinate of the room name code. It is allowed to enter a closed curve by manually designating the corresponding given point of the room-intersecting line.

In addition, the material selection and linking block 80 receives the room name and number codes and room-intersecting closed curve information of the design drawing taken-off from the shape information processing and supplement block 70, and then transfers and updates a handle value for a polyline entity of the room-intersecting closed curve to an extended data (X data) of a room name code entity for building elements of an object disposed in a space for each item and region (in case of a building, for each room), thus making the position and shape of each room linked with one another in the form of a single information.

Here, in the case that the CAD drawing data 20 is a bill of finishing materials 200 and position coordinate input device 300, and the bill-of-material take-off processing engine 50 can input a height information for the drawing included in the CAD drawing data 20.

Here, if the height information is inputted by the keyboard 200 and position coordinate input device 30, the bill-of-material take-off processing engine 50 corrects and supplements a height of each part and region in the CAD drawing data 20 stated as a single project based on the height information. Also, in the case that each material is given a code, it is allowed to link with the material code having a corrected height.

Figure 2:
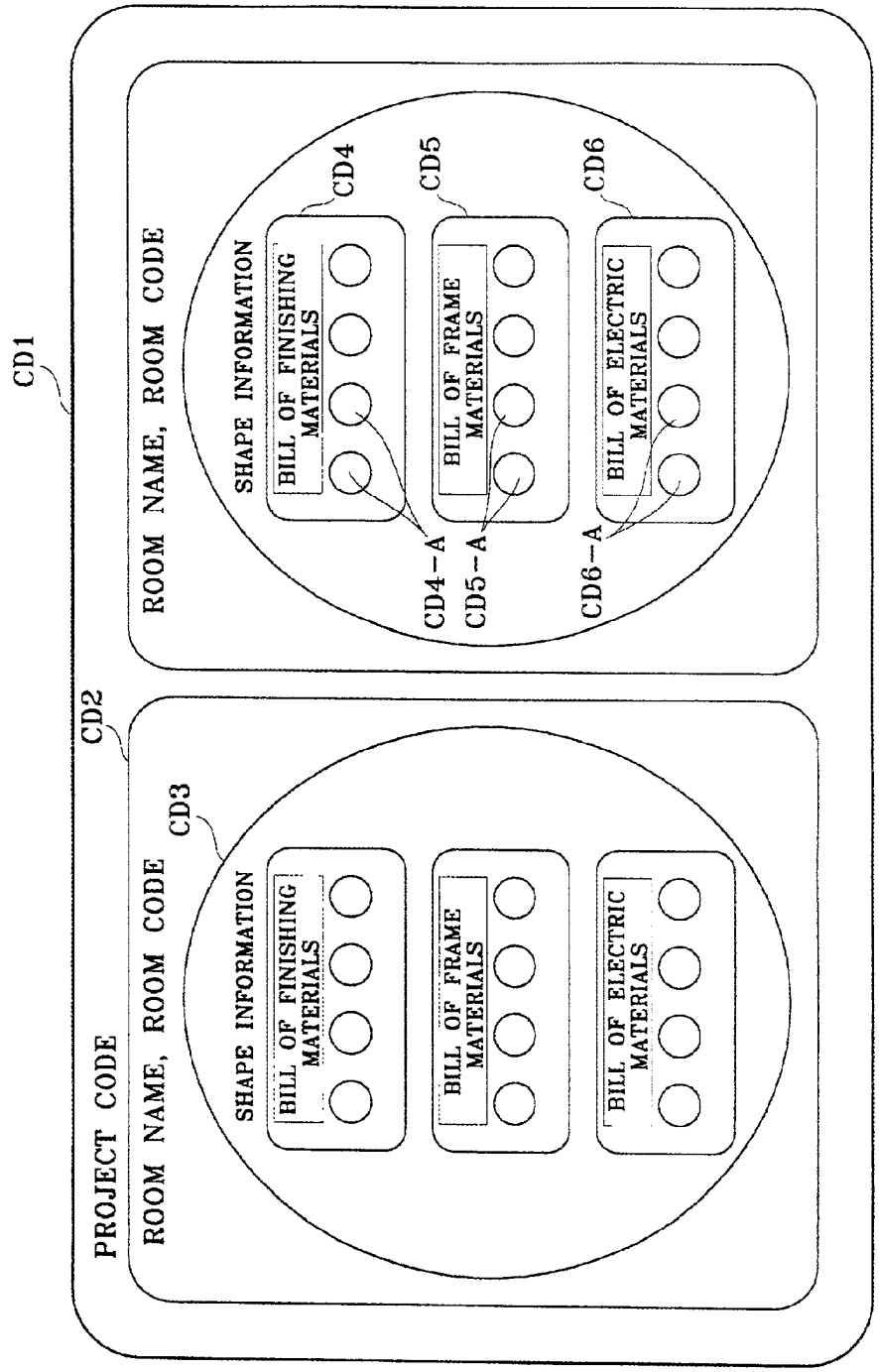
FIG. 2 is a view graphically illustrating a code system given for estimating a bill of materials on a CAD drawing in accordance with the first embodiment of the present invention.

FIG. 2 is a view graphically illustrating a code system given for the take-off of the materials on a CAD drawing in accordance with the first embodiment of the present invention.

As illustrated in FIG. 2, according to the present invention, in the room code entity input block 60 of the bill-of-material take-off processing engine 50, if the design drawing included in the CAD drawing data 20 is given a project code CD1, a plurality of information for each building, floor, and room included in one item which is given the project code CD1 are given their name and code CD2 (i.e., room name and room number code).

On the other hand, in the material selection and linking block 80, a composite material data for an object belonging to its respective room name and room number code CD2 is taken-off based on the room-intersecting closed curve data extracted from the shape information processing and supplement block 70, thus completing shape information CD3 having estimated areas and volumes.

In addition, in the material selection and linking block 80, a bill of materials for each building element of an object, i.e., a bill of finishing materials CD4, bill of frame materials CD5, and bill of electric materials CD6 (or bill of engineering materials, bill including information for a design drawing of a building, such as an apartment, single family house, office, etc., building elements of an object linked with material codes in the material selection and linking block 80 are divided into interior finishes, exterior finishes, windows and doors, walls, and frame finishes. The indoor finishes include room floors, skirting boards, walls, ceilings, etc., the outdoor finishes include outer walls, roofs, etc., and the windows and doors include windows, window frames, metallic materials, etc. The walls include inner and outer walls, masonry, thermal insulation materials, etc., and the frame finishes extract shapes of objects, such as footing columns, girders, slabs, retaining walls, stairs, etc. for thereby the take-off of the materials such as concrete, forms, and reinforcement bars.

In addition, in the bill-of-material take-off processing engine 50, the bill-of-material extraction and supplement block 90 completes a database having shape information for all materials by referring to the project information from the design project information database 30, i.e., the position information and shape information of the drawing, and the material information and cost information from the material/cost database 40, and then takes off a complete bill of materials and cost data for a material code linked by the material selection and linking block 80, thereby generating an take-off sheet for the bill of materials and cost.

In the same drawing, the computer body 100 consists of a keyboard interface 200A and a position coordinate interface 300A, each executing the interface operation for applying a key input signal and coordinate input signal each inputted by the operation of the keyboard 200 and position coordinate input device 300 to the CAD system 10 and the bill-of-materials take-off processing engine 50. In the keyboard interface 200A and the position coordinate interface 300A, the CAD system 10 can create a CAD drawing according to the signal inputted by the operation of the keyboard of facility materials, or bill of landscape materials) are taken off by transferring the handle value of the room-intersecting closed curve entity to the room code.

Here, in the case that the project code CD1 is a code for a building, such as an apartment, business building, etc., the bill of finishing materials CD4 includes a plurality of material codes for finishing materials, such as walls, windows and doors, stairs, miscellaneous works, etc. The bill of frame materials CD5 includes a plurality of shape and position codes for frame members, such as foundations, columns, girders, slabs, retaining walls, etc. The bill of electric materials CD6 includes a plurality of material codes CD6-4 for electric materials, such as lightings, wires, etc. Besides, in the case that the bill of engineering materials, bill of facility materials, or bill of landscape materials is applied, code information for each corresponding object is included.

Figure 3A:
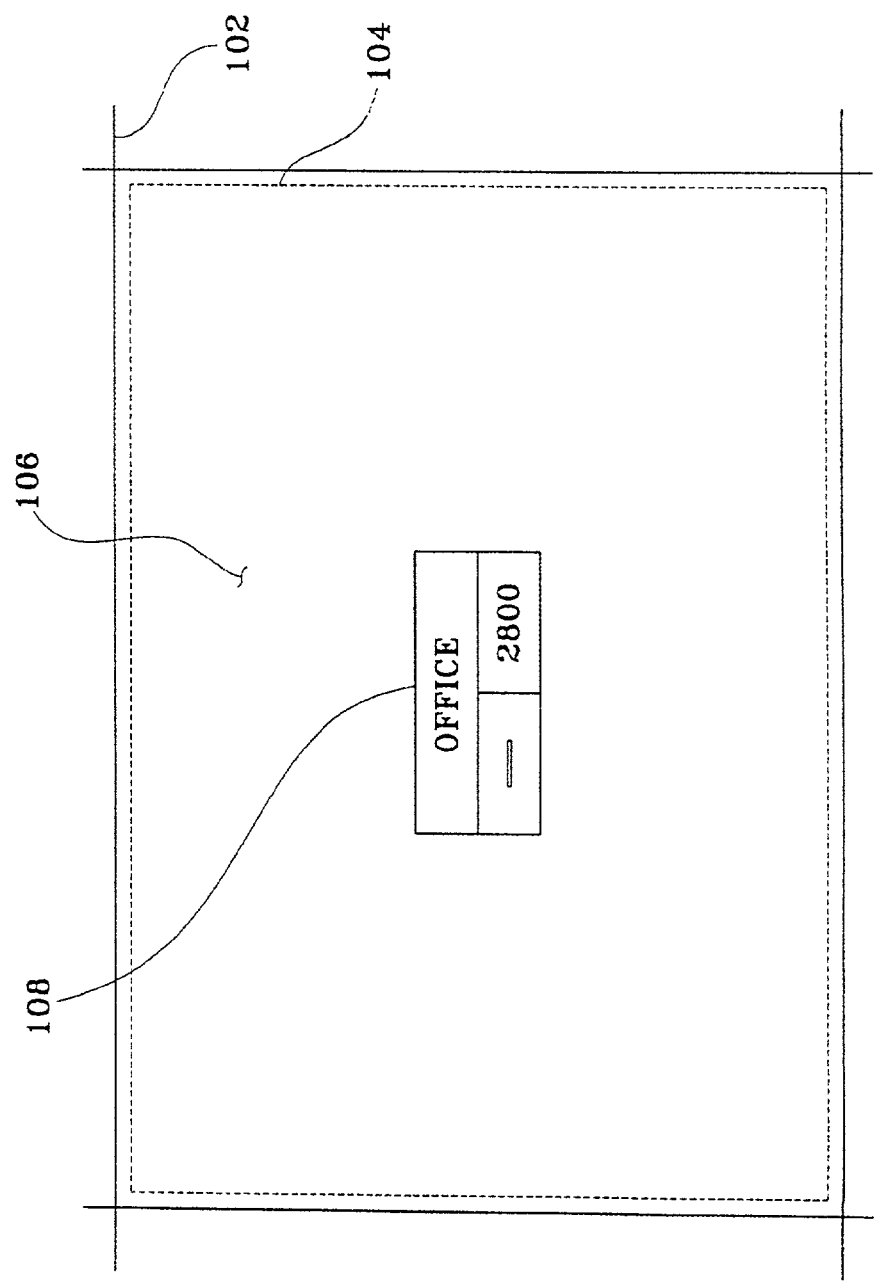
FIGS. 3a through 3c are views illustrating an operation for take-off position information for items stated in a CAD drawing and shape information and material information for each building element adapted to a function of the take-off of finishing materials in accordance with the first embodiment of the present invention.

In addition, in the state that the project code CD1 is given, the process of extracting a room-intersecting closed curve and taken-off a room name and room number code CD2 is illustrated in FIG. 3a.

As shown in FIG. 3a, in the room code entity input block 60, a room code 108 is extracted by the transformation and automatic arrangement of room names and room numbers included in the CAD drawing data 20, thus taken-off position information. In the room code entity input block 60, the room code 108 has a room name designated as, for example, "office", and a height value designated as, for example, "280" by entering e.g., a height value of "H=2800" by means of a user's input using the keyboard 200 or position coordinate input device 300.

Figure 3B:
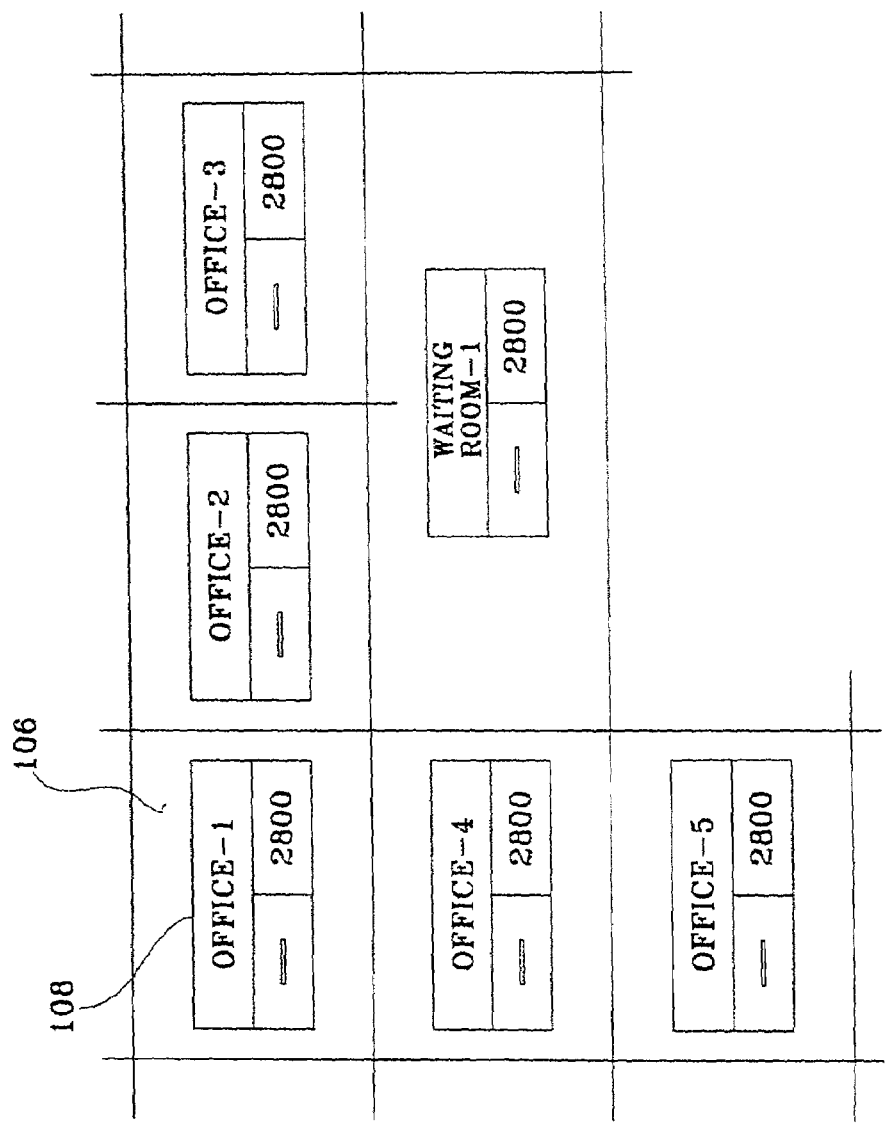

In addition, in the shape information processing and supplement block 70, each room 106 is distinguished with one another by analyzing point information and line information included in the CAD drawing data 20 and making a reference line 102 linking each of points and lines Accordingly, as illustrated in FIG. 3b, in the condition that a room-intersecting closed curve is formed by rooms 106, the room code 108 serves as the center mark of each room 106, for thereby inserting room-intersecting and then completing shape information.

Figure 3C:
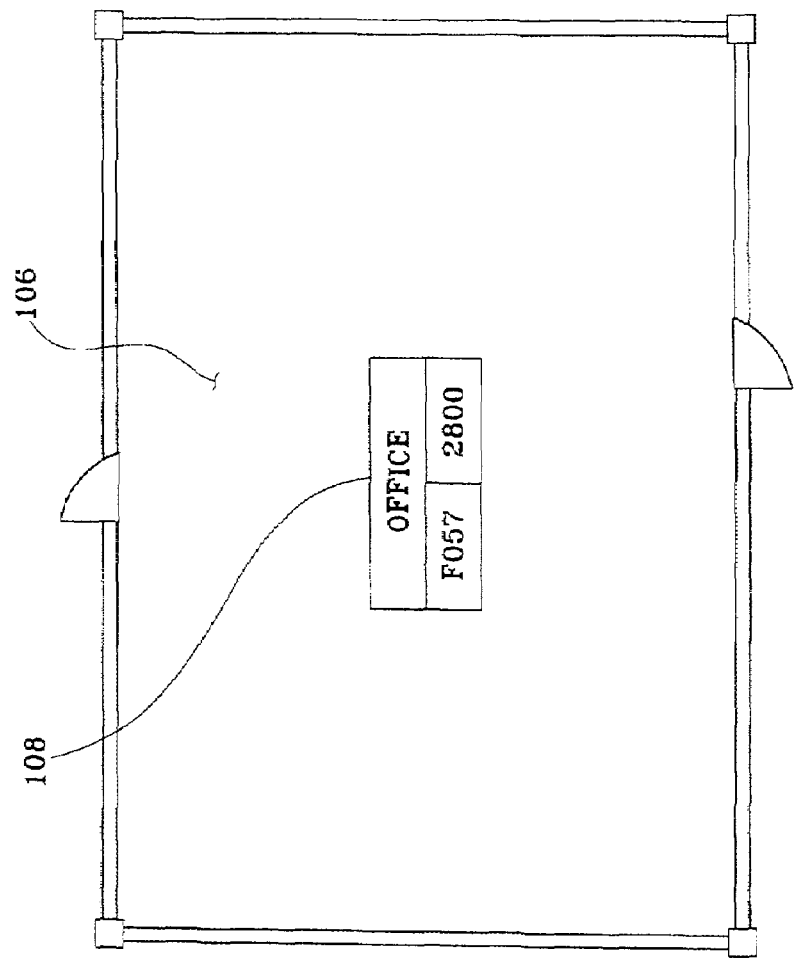

Next, in the material selection and linking block 80, in the condition that the room code 108 is given for each room, the process of linking the handle value of the room-intersecting closed curve entity to the extended data (X data) is illustrated in FIG. 3c.

As illustrated in FIG. 3c, in the material selection and linking block 80, the handle value of the polyline entity of the room-intersecting closed curve generated for each room 106 is transferred to the extended data (X data) of the room name code entity based on the information contained in the material/cost database 40, thereby linking the composite material code (e.g. "F057") representing the material code for each of floors, skirting boards, walls, and ceilings including each room 106 to the room code 108.

For example, if the material code for the walls is "W001", the material code for the skirting boards is "B001", the material code for the floors is "F011", and the material code for the ceilings is "C001", the composite material code is extracted in the form of "W001+B001+F001+C001=F057", and is able to be transferred as a finishing number.

Meanwhile, one example of the entity data for each room contained in the material/cost database 40 by the bill-of-material take-off processing engine 50 is illustrated in FIG. 4.

As shown in FIG. 4, when the transformation and automatic arrangement of room names and room numbers for the CAD drawing data 20 have been achieved by the room code entity input block 60, and a height value is defined by a user's input, the entity data including items of 1 room name, 2 room number, 7 ceiling height, 8 room code xy coordinate (i e., absolute coordinate), and 9 room code xy coordinate (i.e., state coordinate) are stored in the database.

In addition, when a finally combined composite material code, i.e., a finishing number is taken-off by transferring the handle value of the polyline entity of the room-intersecting closed curve to the extended data (X data) by the material selection and linking block 80, the entity data including items of 4 finishing number and 12 room-intersecting polyline handle value are stored in the database.

Meanwhile, in the bill-of-material extraction and supplement block 90, material information fix materials linked with material codes, i.e., a bill of materials and cost are automatically taken-off, and a detailed take-off sheet for the bill of materials and cost is created as shown in FIG. 5.

As illustrated in FIG. 5, the detailed take-off sheet is created for each room having its room name and room code in the corresponding project, and it displays the room shape, planimeter, name, specification, unit and yield, estimation formula, and unit cost for each building element.

In other words, in the present invention, most users can automatically analyze shape and material information and extract a necessary value and unit cost in a two-dimensional CAD drawing drafted by the CAD system 10 without any particular manual work by extracting design information in a CAD drawing and supplementing insufficient parts, while prior part users enter a value or estimation formula by a manual work.

Of course, although a prior art system for taking-off material details based on a three-dimensional CAD also has a function of automatically extracting a value, it is wholly different from the system of the present invention in that it has an interface in which a user must enter complete information for three-dimensional modeling from the point of view of a two dimension and three dimension. In the system of the present invention, most users can easily access the system and enter repetitive information (e.g., a height value) all at once, because they are accustomed to drawing a two-dimensional drawing. This proves that the system of the present invention gains an absolute advantage over a system using three-dimensional modeling in its accessibility, usability, compatibility, and working time.

In addition, according to the present invention, it is made possible to correct and change a design drawing in real time by an arbitrary operation of the operator by constructing shared and repetitive position information and construction materials and cost based on the information contained in the design project information database 30 and the material/cost database 40 and linking them with a CAD entity.

Next, the above-described embodiment of the present invention will now be described in detail with reference to the flow charts of FIGS. 6a and 6b an FIG. 7.

Figure 6A:
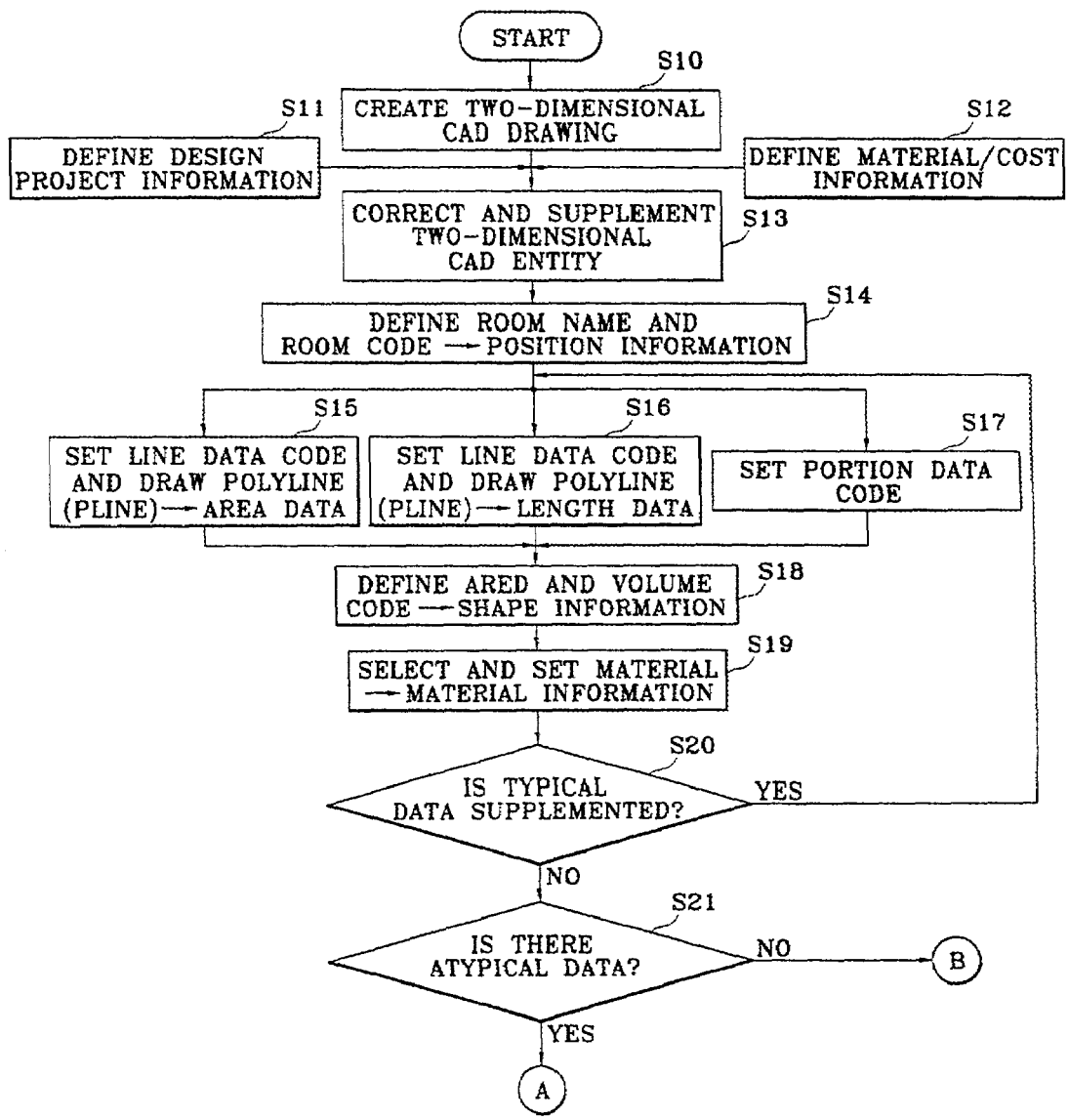
FIGS. 6a and 6b are flow charts explaining a method for the take-off of the materials using a two-dimensional CAD interface in accordance with the first embodiment of the present invention.
Figure 6B:
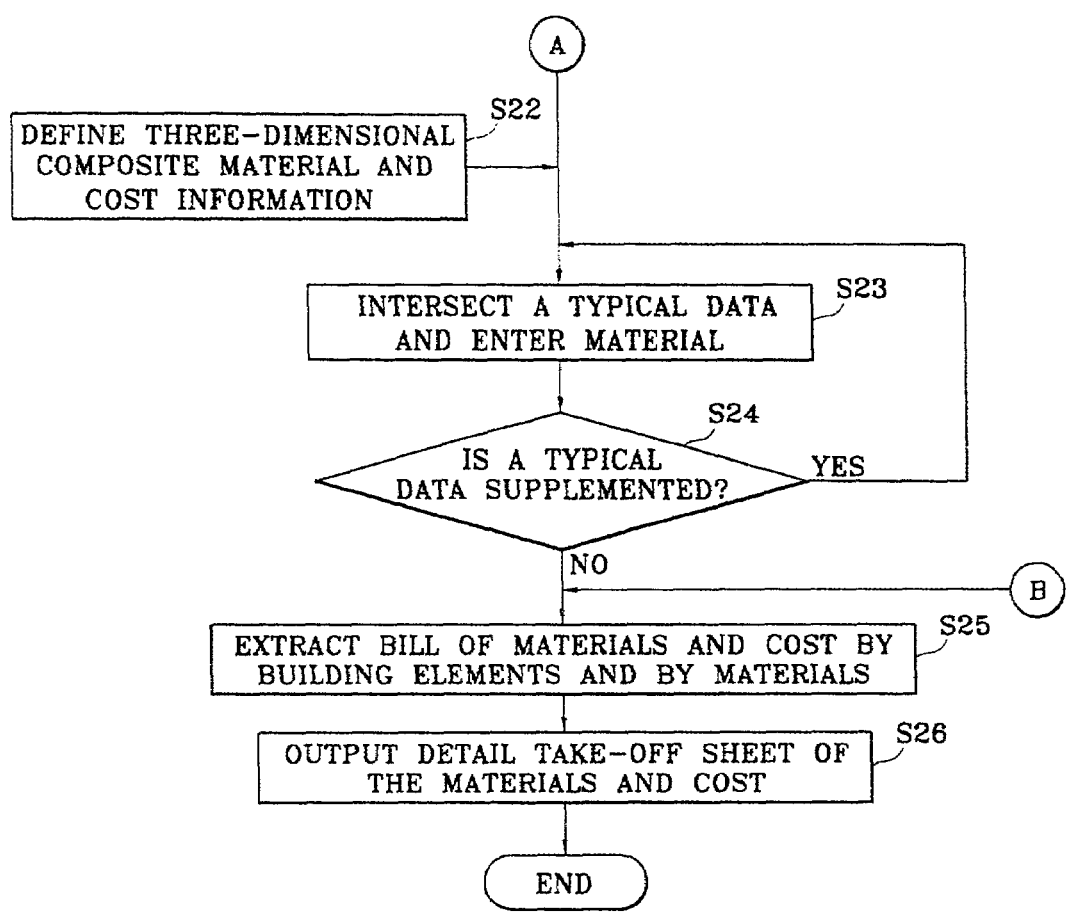

Firstly, as illustrated in FIGS. 6a and 6b, the CAD system 10 constituting the computer body 100 creates a CAD drawing data 20 having a two-dimensional entity for a predetermined project by a user's operation using the keyboard 200 and the position coordinate input device 30 in S10. In addition, in the design project information database 30 of the computer body 100, the project information related to the CAD drawing data 20 is determined by the operation of the keyboard 200 and the position coordinate input device 300 in S11. In the material/cost database 40, material codes and cost information for materials corresponding to the project are established in S12.

In this state, in the room code entity input block 60 of the bill-of-material take-off processing engine 50, the CAD drawing data 20 created by the CAD system 10 is given a project code, and the entity in the design drawing is corrected or supplemented so that it is suitable for the related project based on the position information, design specifications, and shape information according to the project information of the design project information database 30 in S13.

When the correction and supplementing of the entity for the CAD drawing data is completed, the room code entity input block 60 divides design drawings by buildings, floors, and rooms, and then transforms and automatically arranges room names and room number codes based on the information stored in the design project information database 30, thereby estimating the position information for the drawing included in the CAD drawing data 20, and applying a height value for the CAD drawing data 20 in S14.

Meanwhile, each of building elements in the CAD drawing data 20 having a room name and room number code given by the room code entity input block 60 consists of line data, surface data, and portion data. The shape information processing and supplement block 70 of the bill-of-material take-off processing engine 50 takes off are a data by establishing a code for the surface data included in the drawing information for each room and drawing a polyline of the CAD drawing data 20 in S15. The bill-of-material take-off processing engine 50 takes off data for horizontal lengths and longitudinal lengths by establishing a code for the line data and drawing a polyline in S16, and establishes a code for the portion data for a member included in the area data and the length data in S17.

In other words, in the case that the CAD drawing 20 created by the CAD system 10 is used for, for example, the design of a building, the area data extracted from the shape information processing and supplement block 70 relates mainly to floors, skirting boards, walls, ceilings, stair halls, etc. of each room having a property of intersecting a space, and the length data relates mainly to walls, girders, slabs, retaining walls having a property of lines.

In addition, the portion data relates to windows, doors, columns, etc. of a building. Since such members are defined to be contained in the design project information database 30 in the form of a list, only the portion and position of the corresponding object are extracted.

Accordingly, in the shape information processing and supplement block 70 of the bill-of-material take-off processing engine 50, the entity of the room-intersecting closed curve is formed according to the reference line generated based on the surface data and length data in the CAD drawing data 30 having a room name and room number code defined for each room, thereby completing shape information in S18.

Meanwhile, in the material selection and linking block 80, the handle value of the polyline of the room-intersecting closed curve formed by the shape information processing and supplement block 70 is transferred to the extended data (X data) in the room code entity data, based on the project information from the design project information database 30 and the material code and cost information from the material/cost database 40, thereby linking the position information and shape information for each room with each other as a single information.

When the position information and shape information for each room are linked with each other as a single information, the material for each building element of an object is selected, and is linked with its material code, based on the shape information. Thus, when the linking of the composite material code formed by a combination of such material codes is completed, it is judged whether or not typical data defined in the material/cost database 40 needs to be supplemented in S20.

As the result of the decision, if the material selection and linking block 80 judges that typical data needs to be supplemented, the steps S15, S16, and S18 are repeated. However, if it judges that typical data does not need to be supplemented, it is judged whether or not there exists atypical data not defined in the material/cost database 40, i.e., information for composite materials for each building element of the object in the CAD drawing data 20 stated in S21.

Meanwhile, the material/cost database 40 contains the atypical data for composite materials of various shapes that may exist in the corresponding project in the form that can be analogized in a three-dimension by users operation, and also contains the cost information for each composite material in S22.

In this condition, the material selection and linking block 80 judges whether there exists a building element requiring the supplementing of the atypical data in the design drawing in S24. If the atypical data needs to be supplemented, the step S23 is repeated.

Then, the bill-of-material extraction and supplementing block 90 of the bill-of-material take-off processing engine 60 automatically extracts a bill of materials and cost based on the composite material code linked for each building element and material in S25. As described above, the take-off of the materials and cost is generated in the form of a detail take-off sheet in S26.

Meanwhile, the detailed take-off sheet generated by the bill-of-material extraction and supplement block 90 is outputted as a result screen on the display monitor 400, and it can be printed out by a printer.

Next, the operation of taking-off a height information for the CAD drawing among the overall operating relations of the system for the take-off of the materials will now be described in detail with reference to the flow chart of FIG. 7.

First, the bill-of-material take-off processing engine 50 loads a two-dimensional CAD drawing data 20 created by the CAD system 10 in S30, and the room code entity input block 60 automatically analyzes the line data for the loaded CAD drawing data 20 with reference to the project information of the design project information database 30, thereby take-off position information by definition of room names and room number codes for each building, floor, and floor space type in S31.

In this state, the room code entity input block 60 extracts a text data set for each building element to be encoded in the design drawing of the CAD drawing data 20 in S32. In addition, the room code entity input block 60 divides building elements for each object by code block types, and applies a default height defined in the material/cost database 40 in S33. Then, how the height value is applied to code blocks of the data set is specified in S34.

Then, the room code entity input block 60 executes the process of extracting a text value, position coordinate, and height for each code block having the default height in S35. Referring to the information contained in the material/cost database 40, a property is given for each extracted code block in S36.

Meanwhile, the room code entity input block 60 judges whether the code block having the property is the last one of the data set or not in S37. If not, the default height is applied to the corresponding code block of the text data set in S38, and then the steps S34 through S36 are repeated.

As the result of the judgment, if the room code entity input block 60 judges that the last code block of the text data set has been handled, it judges whether the height for a group of codes having partially different height values is to be corrected or not in S39.

As the result of the judgment, if there is a need for correcting the height for the group of codes having partially different height values, the room code entity input block 60 corrects and enters a height for each unit by the user's operation of the keyboard 200 and position coordinate input device 300 in S40. If the height for each unit is corrected and entered, a code for correcting and supplementing a height for each unit of code blocks is selected in S42, and then the height is corrected and updated by code blocks by applying the corrected and entered height information in S42.

Then, the room code entity input block 60 judges whether or not there exists a code block having a height to be corrected in S43. If it is judged that there is no code block having a height to be corrected, the correction and updating process is finished.

Therefore, by the execution of the above-described steps, since it is possible to selectively correct a group of parts in the design drawing at once, heights for all materials are entered instantly they are corrected and updated.

Next, a second embodiment of the present invention will now be described in detail with reference to the accompanying drawings.

That is, the construction according to the second embodiment of the present invention is identical to that according to the first embodiment as shown in FIG. 1, so a detailed description thereof will be omitted.

The technical characteristics of the second embodiment of the present invention will now be described in FIGS. 8a through 8c.

Figure 8A:
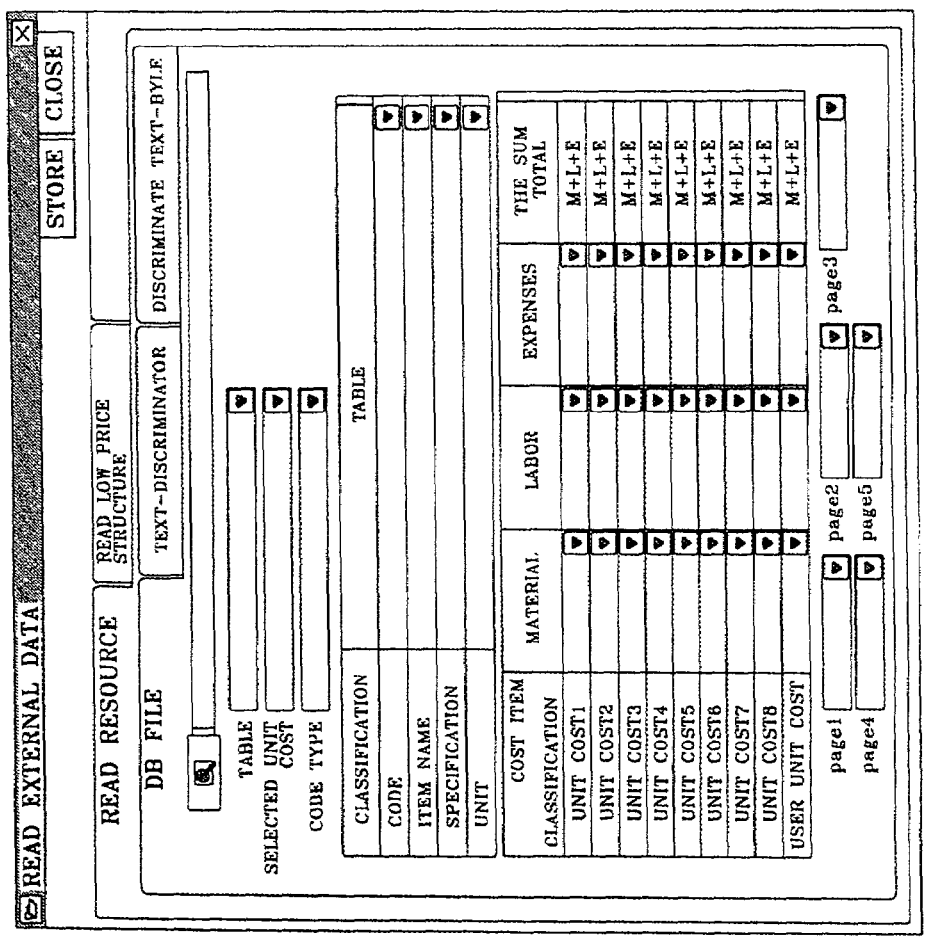

FIGS. 8a through 8c are views illustrating one example of the driving of a program of a system for the take-off of the materials which is standardized by interchanging code systems of various materials in a multi-direction in accordance with a second embodiment of the present invention. In FIGS. 8a through 8c, as one example for explaining the second embodiment of the present invention, a classification system for codes for construction types of a temporary work related to a predetermined building and the driving state of the program for taking-off cost for building elements thereof are illustrated.

As illustrated in FIG. 8, the design project information database 30 contains codes classified and given for all materials having various standard patterns for the category of architecture, and the code for the construction type corresponding to the contents of the drawing stated in the CAD drawing 20 can be selectively extracted.

As illustrated in FIGS. 8b and 8c, the material/cost database 40 comprehensively contains material information corresponding to standardization codes for all construction types contained in the design project information database 30 and cost information thereof, and the cost for a desired material code can be extracted by the program driving operation of the bill-of-material take-off processing engine 50.

In other words, according to the second embodiment of the present invention, the above-described code system is transformed into a reference code system by analyzing a number of code systems, and then takes off a bill of materials to convert it into a detail take-off sheet. This is a kind of a HUB code system which analyzes the characteristics and logical systems of all code systems and generates logical systems for receiving all of them.

That means that an operator can easily use a variety of code systems by projects in the take-off of the materials by supporting code classification systems for all materials, rather than supporting only a specific code classification system in the prior art.

Meanwhile, in the thusly constructed present invention, although one example for taking-off material details for building elements of an object stated in the CAD drawing is applied to the category of architecture, the category of public facilities such as roads, harbors, aerodromes, etc., it also can be applied to the category of manufacture of various construction machinery and manufacturing machinery, and the category of product design of appliances and fixtures in the same manner.

Figure 9:
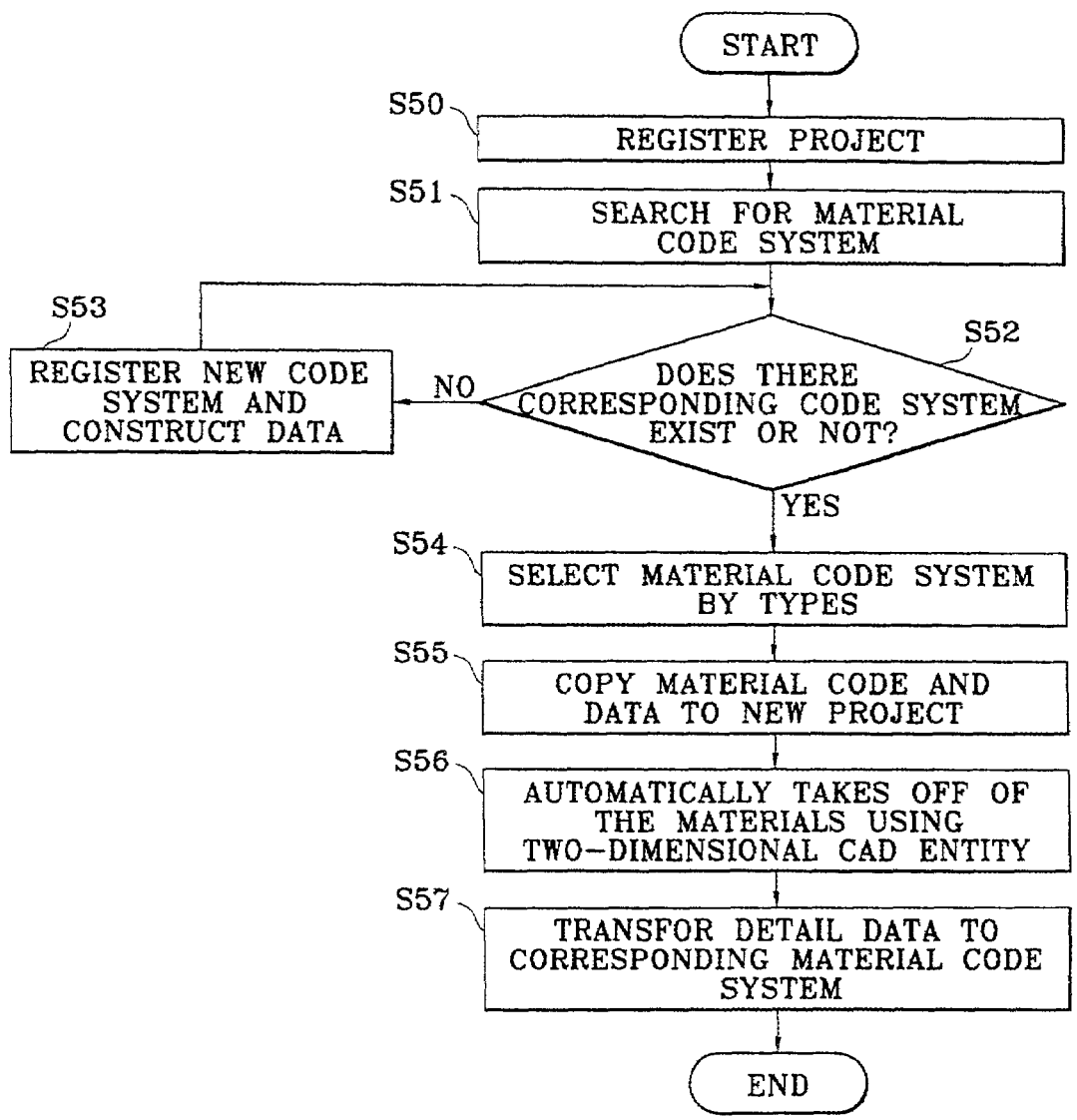
FIG. 9 is a flow chart explaining an operation for interchanging the code systems of various materials in a direction of standardization in accordance with the second embodiment of the present invention.

Continuously, the above-described second embodiment of the present invention will now be described with reference to the flow chart of FIG. 9.

In the second embodiment of the present invention, all estimation formulas under materials are unnecessary, and a bill of materials must be transferred by inputting a code, name, specification, and unit to the bill of materials. Since the information contained in the database and its format is different according to the specifications of the system supporting a number of code systems, previously processed material data is analyzed and transformed.

First, in the design project information database 30, a project for the category of construction, facilities, and manufacture requiring design is registered in S50, and the material code system corresponding to the category of the registered project is searched in S51.

In this state, it is judged whether there exists a material code system corresponding to the registered project or not. If there is no code system contained (i.e., NO in S52), a new code system is registered, and the related information data is constructed in S53.

On the contrary, it is judged that there exists a code system corresponding to the project (i e., YES in S52), a material code system for each type is selected in the design project information database 30 in S54. In addition, in the design project information database 30, the material code and related information data for the registered project are copied in S55.

Next, the bill-of-material processing engine 50 executes the operation of the take-off of the materials using an entity in a two-dimensional CAD drawing based on the code information and related information data for the corresponding project contained in the design project information database 30 in S56.

Meanwhile, when the bill of materials is taken-off by using the entity for the design drawing, detail data is transferred to the corresponding material code system in S57.

Continuously, a third embodiment of the present invention will now be described in detail with reference to the accompanying drawings.

Figure 10:
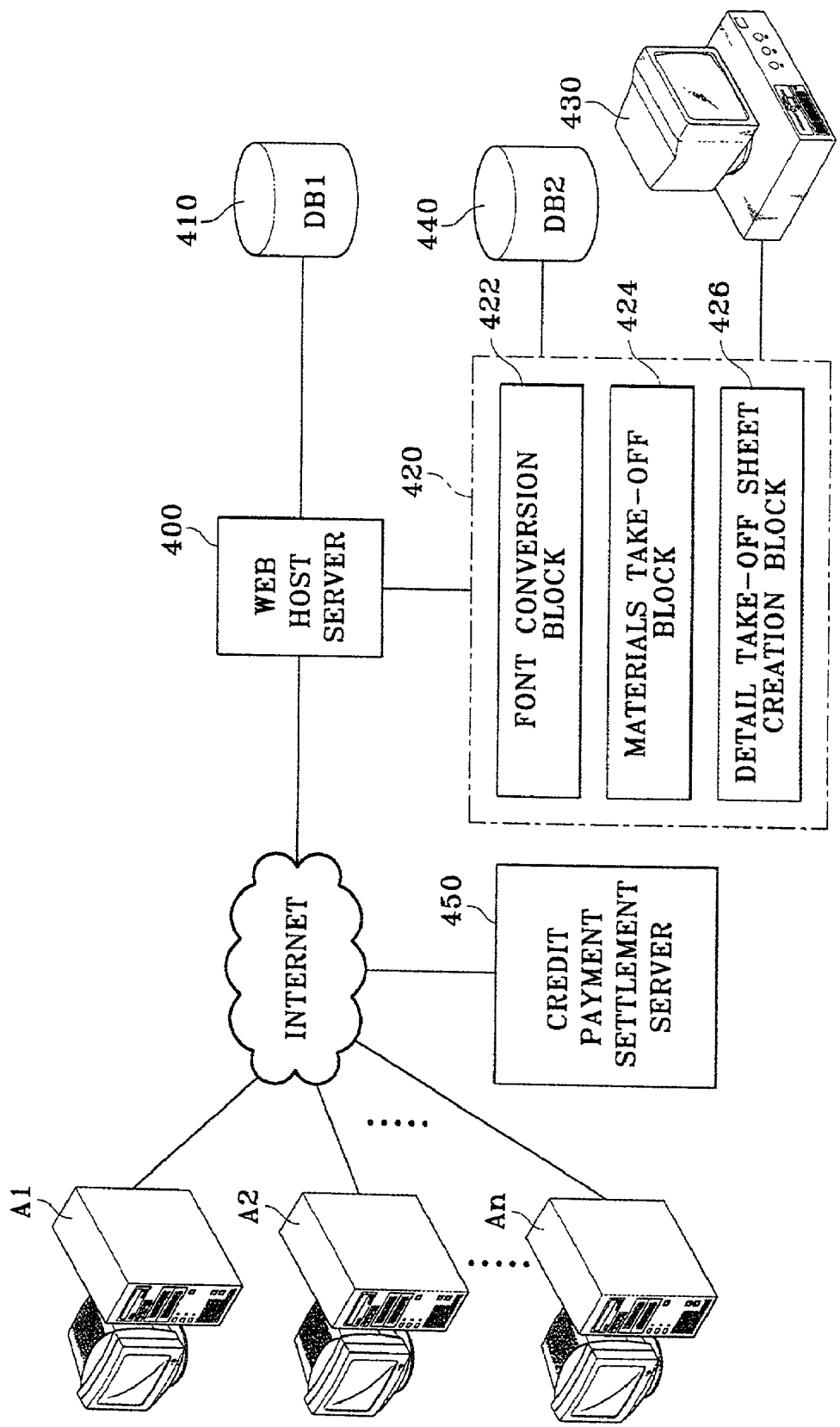
FIG. 10 is a view illustrating the entire system of a communication network system for realizing a system for taking-off the material data using a two-dimensional CAD interface in accordance with a third embodiment of the present invention.

In other words, FIG. 10 is a view illustrating the entire system of a communication network system for realizing a system for the take-off of the materials using a two-dimensional CAD interface in accordance with a third embodiment of the present invention;

As illustrated in FIG. 10, the system according to the present invention includes: a plurality of client computers A1 through An for requesting a provision service of building and construction information for a design drawing in which objects and materials for a design item, such as various buildings, engineering structures, facilities, machines, etc., are stated in a two or three dimension; a web host server 400 for receiving an order for a provision service of various information for the design drawing, and managing a web site and e-mail system for sending service cost take-off and payment and a detail take-off sheet of a bill of materials and cost; a service information database 410 containing request information and service cost take-off information according to a service information provision request of a certain client, and CAD data and image data for the design drawing being requested; an information take-off processing system 420 for analyzing and taking-off various information for the design drawing transmitted from the client; a management computer 430 for managing the analysis and take-off of the information of the corresponding information take-off processing system 420; a bill-of-material take-off information database 440 containing various fonts and code information for analyzing and taking-off information; and a credit payment settlement server 450 for executing the payment of service cost for the take-off of the materials according to a settlement request of the web host server 400.

Here, the building and construction information means an integrated database of a bill of materials, details, and process cost for the design drawing, and shape and position information for four-dimensional virtual reality (VR)(i.e., a combination of a three-dimension with a change in information according to the lapse of time).

In the same drawing, the plurality of client computers A2 through an have a CAD program constructed for creating a two-dimensional design drawing for a predetermined project, and a modem or LAN card built for connecting to the web host server 400 via the internet as a communication network. In addition, they can place an order for a bill of materials for the design drawing created by the CAD program via the internet by operating a dedicated web browser program.

Here, the plurality of client's computers A1 through An are allowed to upload the design drawing having the information to be analyzed and estimated on a transmitted page for a web site constructed in the web host server 400, and transmit the same in the form of e-mail.

The web host server 400 has a web site constructed for executing an information provision service request for a predetermined two-dimensional design drawing by connecting thereto via the internet communication network from the plurality of client's computers A1 through An, and has an estimation cost calculation program built for calculating the take-off of service cost according to the building use and scale for the design drawing.

In addition, the web host sewer 400 transmits CAD drawing or image information containing the drawing received from the plurality of client computers A1 through An in a transmitted page from the web site or in the form of e-mail to the information estimation processing system 420 for the purpose of requesting an information provision service, thereby making the analysis ad take-off of the information complete. In addition, the web host server 400 processes a detailed take-off sheet of the information according to the result of the information analysis and take-off information received from the information take-off processing system 420 in the form of data files of e-mails for thereby transmitting the same to the corresponding client computer.

The service information database 410 contains a reference table of service costs for receiving an order for an information provision service of building and construction information for a CAD drawing which are classified according to the scale or use of a building item, contains taken-off values of service costs for the CAD drawing for which a certain client has requested an information provision service, and contains data of the design drawing received from the corresponding client computer in the form of CAD files or image files.

In the same drawing, the information estimation processing system 420 takes off material information, texture information, shape and position information, and bill of material and cost information for building elements of an object included in the design drawing created in the form of CAD files or image files received from a website constructed in the web host server 400 or in the form of e-mail, and issues the resultant detail take-off sheet of the information.

The information take-off processing system 420 includes: a font conversion block 422 for automatically converting various font data each supported by CAD programs of various product types or versions constructed in each of the plurality of client computers A1 through An into compatible fonts; a bill-of-material take-off block 424 for take-off material information, texture information, shape and position information, and bill of material and cost information for building elements included in the design drawing for which a certain client has requested an information provision service based on the code information for multi-directional materials and cost contained in the take-off information database 440; and a detail take-off sheet creation block 426 for creating a detail take-off sheet of various information taken-off by the bill-of-material take-off block 424.

Here, the font conversion block 422 is used for automatically converting various fonts of the CAD drawing into specific font data supported by the corresponding information take-off processing system 420 so that font styles of the drawing cannot be broken, since there is a wide variety of CAD programs constructed in the plurality of client computers A1 through An, and accordingly fonts supported by each of the CAD programs have a property of being non-compatible with one another.

In addition, the bill-of-material take-off block 424 of the information estimation processing system 420 takes off position information for each building element by classifying the CAD drawing for a bill-of-material take-off request by parts and regions, takes off shape information for the building element for each position information, and then takes off the materials and cost for an object included in the drawing by linking a material code with a cost code by materials and construction types according to the code information contained in the bill-of-material estimation information database 440 based on the shape information.

The detail take-off sheet creation block 426 is used for creating a detailed take-off sheet of a bill of materials including quantities, take-off formulas, and costs for each building element and item name with reference to a bill of materials and cost for an object in the CAD drawing taken-off by the bill-of-material take-off block 424.

Meanwhile, in the same drawing, the management computer 430 selects atypical data of which is difficult to automatically take-off material details by the information take-off processing system 420, takes off an environment for extracting contour lines such as wall lines, and executes a input job for setting a height needed to take-off areas and volumes for a two-dimensional design drawing.

In addition, the bill-of-material take-off information database 440 contains material code systems and cost code information so that they can be converted in multi-directions for a project of various categories for which the plurality of client computers A1 through An can place an order, and supports an automatic font conversion program so that fonts of the CAD drawing being created by various CAD programs and having various font styles are made compatible with one another normality.

Figure 11:
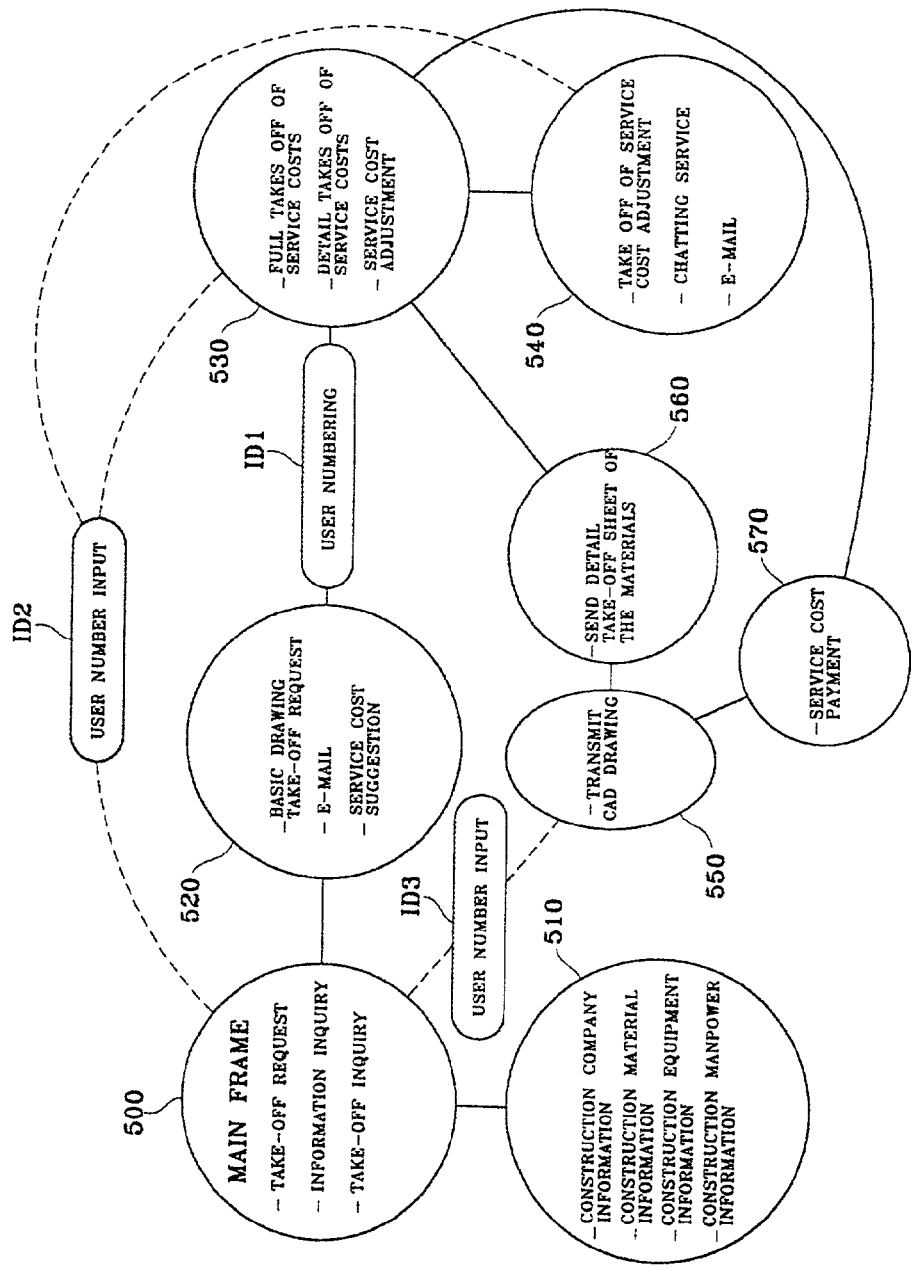
FIG. 11 is view illustrating one example of the implementation of a building and construction information service via a communication network in the form of internet web pages in accordance with the third embodiment of the present invention.

FIG. 11 is a view illustrating one example of the implementation of a bill-of-material take-off service for a two-dimensional CAD drawing via a communication network in the form of internet web pages in accordance with the third embodiment of the present invention.

As illustrated in FIG. 11, the web host server 400 has a web site constructed for receiving an order for an information provision service of building and construction information for a predetermined two or three-dimensional CAD drawing from the plurality of client computers A1 through An, and for taking-off a service cost according to a request for the information provision service and paying the cost. The main frame page for the web site includes an take-off request hypertext item, an information inquiry hypertext item, and an take-off inquiry hypertext item.

In addition, the information inquiry hypertext item of the main frame page 500 is linked with a drawing take-off page 520. The drawing take-off page 520 includes a basic drawing take-off request page for entering a building scale and use for a basic take-off request for a CAD drawing, an e-mail program link items for transmitting by e-mail the CAD drawing for which a bill-of-material take-off is to be requested by e-mail, and a service cost suggest page in which a cost can be entered so that a client can suggest a service cost.

Here, when an take-off request is made in the drawing take-off page 520, a user number is given for the take-off request in a user numbering page ID1 so that the client can make a protective connection.

In addition, the user numbering page IDI is linked with a service cost take-off page 530 for disclosing a detail take-off of a service cost. The service cost take-off page 530 discloses service costs calculated based on a building scale and building use entered by the client in the basic drawing take-off request page of the drawing take-off page 520 in the corresponding web host server 400. The service cost take-off page 530 includes a complete service cost take-off page for disclosing a complete estimate of costs, a detail take-off page for disclosing details of costs, and a service cost adjustment hypertext item for adjusting a service cost.

Meanwhile, the service cost adjustment hypertext item of the service cost take-off page 530 is linked a service cost adjustment page 540. The service cost adjustment page 540 includes a service cost adjustment take-off page for disclosing the state and result of the adjustment of a service cost in real time, a chatting service page for exchanging adjustment information of a service cost with the client through a character or voice chatting service, and an e-mail program link item for exchanging the adjustment information of the service cost in the form of e-mail.

In other words, in the service cost adjustment page 540, the adjustment of a service cost can be performed in real time through the character or voice chatting service or through an e-mail exchange service.

When a final decision on a service cost is established in the service cost take-off page 540, a detail take-off sheet of a bill of materials generated as a result of the take-off of the materials by the information estimation processing system 420 is sent to the corresponding client computer in the form of e-mail files via the a bill-of-material take-off sheet sending page 560.

Meanwhile, the service cost take-off page 530 and the service cost adjustment page 540 can directly execute the inquiry and adjustment of a service cost by inputting a user number later, since they can make a direct link connection by entering the user number from the main frame page 500 in a user number input page ID2, even though the drawing take-off page 520 finishes connection to the web site after executing the take-off for the CAD drawing.

In addition, the main frame page 500 is linked with a CAD drawing transmission page 550 by entering a user number in a user number input page ID3. The CAD drawing transmission page 550 can be uploaded into a storage space of the drawing take-off page 520 at the estimation for the drawing in the drawing take-off page 520, in the case that the CAD drawing for which a bill of materials is to be taken-off is not transmitted by e-mail.

In the same drawing, the CAD drawing transmission page 550 is linked with the bill-of-material take-off sheet sending page 560 for sending a detail take-off sheet of a bill of materials. The service cost estimate page 530 and the CAD drawing transmission page 550 are linked with a service cost payment page 570 for paying a service cost according to a predetermined payment method, such as a bank payment method, credit card payment method, etc.

Figure 12:
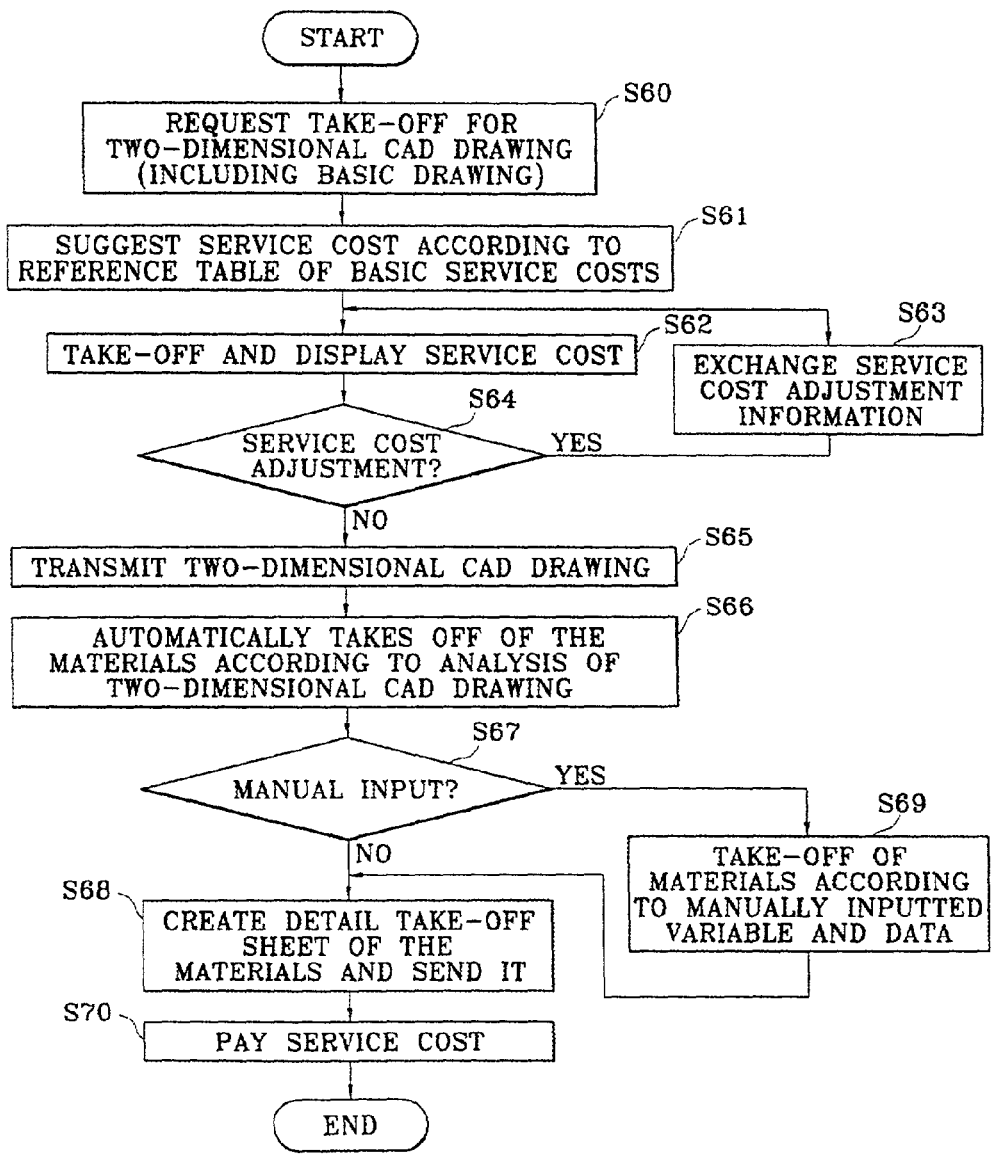
FIG. 12 is a flow chart explaining an operation for the method for taking-off material data using a two-dimensional CAD interface in accordance with the third embodiment of the present invention.

The operation of the third embodiment according to the present invention will now be described in detail with reference to the flow chart in FIG. 12.

First, a certain client computer among the plurality of client computers A1 through An, operates a dedicated web browser program, connects to the web site constructed by the web host server 400 through the internet communication network, and places an order for an information provision service for the created CAD design drawing, i.e., executes an take-off request in S60.

In this state, the client computer having requested an take-off enters the information on the building scale and use for the corresponding design drawing in the drawing take-off page 520 for the web site, and transmits service cost suggest information according to a reference table of basic service costs for a project related to the design drawing via the internet in S61.

At this time, the corresponding client computer may transmit only the basic drawing of the CAD drawings to the web host server 400 via the e-mail program link in the drawing take-off page 520 for the web site by operating an e-mail program, or may transmit the entire CAD drawings thereto in the form of e-mail.

In addition, when an estimation request is made in the drawing take-off page 520 according to the order for an information provision service for the CAD drawing, the web host server 400 allows the user number for the take-off request to be given for the corresponding client computer.

Accordingly, the web host server 400 takes off a service cost for the design drawing for which a bill-of-material take-off has been requested with reference to the service cost suggest information, and discloses the same in the service cost take-off page 530 in S62. Also, it judges whether or not the client computer executes the operation for adjusting a service cost in S63.

As the result of the judgment, if it is judged that the client computer executes the operation for adjusting a service cost, the web host server 400 accesses to the service cost adjustment page 540, and then adjusts a service cost by exchanging information with the client by a character chatting or voice chatting service or by exchanging the adjustment information for a service cost via the e-mail program link items in the form of e-mail in S64.

On the contrary, if the client computer makes a final decision on the take-off of a service cost without an operation for adjusting a service cost, the web host server 400 receives a CAD drawing via the CAD drawing transmission page 550, or receives the same in the form of e-mail in the drawing take-off page 520 in S65.

At this time, the font conversion block 422 of the information take-off processing system 420 converts fonts stated in the CAD drawing into compatible fonts so that they cannot be broken based on contained information in the bill of material take-off information database 440, and automatically the take-off of the materials as the bill-of-material take-off block 424 applies material codes for each building element and cost information.

Meanwhile, the information take-off processing system 420 judges whether or not there exists atypical data, and whether or not a variable determined to take-off a bill of materials need be manually inputted in S67. If there exists an item required to be manually inputted, the management computer 430 executes manual operations for inputting a variable and selecting atypical data, and the take-off of the materials based on the manually inputted value in S69.

However, if the information take-off processing system 420 judges that a manual input by the management computer is unnecessary, the detail take-off sheet creation block 426 creates the material information, texture information, shape and position information, and bill-of-material and cost information for each building element taken-off by the bill-of-material take-off block 424 in the form of a detail take-off sheet of a bill of materials, and the detail take-off sheet of a bill of materials is sent to the corresponding client computer in the form of e-mail file in S68.

Meanwhile, if the client computer receives the detail take-off sheet according to the take-off of the materials and cost for the corresponding CAD drawing, a service cost predetermined by the service cost payment page 570 in the web site of the web host server 400 is paid according to a predetermined payment method, and the web host server 400 connects to the credit payment settlement server 450 for thereby executing credit inquiry and payment settlement for the client in S70.

Meanwhile, in accordance with the embodiment of the present invention, the web site constructed in the web host server 400 opens a web page for disclosing a bill-of-material take-off information which does not need protection and which can be open to many and unspecified persons, thus making the information opened to or shared between many and unspecified persons.

While the invention has been shown and described with reference to certain preferred embodiments thereof, it will be understood by those skilled in the art that various changes in form and details may be made therein without departing from the spirit and scope of the invention as defined by the appended claims. For example, although the first embodiment of the present invention is limited to the construction for the take-off of the materials and cost for a two-dimensional CAD drawing in a computer body 100 connected with a keyboard 200, position coordinate input device 30, and display monitor 400, it also can be implemented as a multiple system in which CAD drawing exchange and bill-of-material and cost information exchange is made possible by connecting at least two computer terminals each having a two-dimensional CAD system and a bill-of-material take-off processing engine via a LAN network.

In accordance with the present invention, since it is possible to automatically take-off numerical information of a bill of materials for a CAD drawing created by an existing CAD program, a data input job is sharply reduced, and working time and labor are greatly reduced In addition, an error occurred in re-analyzing an expert and complicated design drawing by a manual work can be corrected, and more accurate and objective information can be extracted.

In the present invention, an existing two or three-dimensional design drawing is directly utilized, and entered and supplemented in a two-dimensional method, without converting a two-dimensional CAD data into a three-dimensional CAD data, or directly creating and supplementing a three-dimensional CAD data, thereby making the collection of basic data processed and simplifying an input method. Moreover, a bill-of-material take-off database applied to take off numerical information for the design drawing could be shared with one another, thus improving working efficiency, reducing working time, and maintaining objectivity.

In addition, an information provision service of various bill-of-material information for a two or three-dimensional CAD drawing can be provided via the internet communication network, thus improving the workability and standardization of a designer's take-off of a bill of materials, reducing the overall period of time for construction, and greatly improving the workability of construction.

What is claimed is:

1. A system for the take-off of the materials using a two-dimensional CAD interface, in a computer terminal having a CAD system for creating a variety of design items for architecture, civil engineering, machinery, and facilities in a CAD drawing, comprising:

project information containing means for containing project information including position data, design specifications, and shape data for a variety of design items;

material/cost containing means for containing material information and cost information for building elements included in a CAD drawing in which a variety of design items for a project are stated; and bill-of-material take-off processing means for the take-off of the materials cost for an object by analyzing position information, shape information, and material information for building elements included in the CAD drawing created by the CAD system with reference to the project information of the project information containing means and the material information and cost information of the material/cost containing means, wherein the bill-of-material take-off processing means comprises:

a device for extracting position information by extracting a room code having a name and a position code for building elements for each building, floor, and room of the CAD drawing and correcting and supplementing an entity of the CAD drawing with reference to the project information of the project information containing means;

a device for extracting shave information for building elements for each building, floor, and room having a given position information;

wherein the device for extracting shape information extracts shape information for forming a closed curve with center on a reference line intersected by objects having a given room code by analyzing line data, surface data, and portion data for building elements for each building, floor, and room included in the CAD drawing, a device for selecting a composite material code of the material/cost containing means and linking the same with materials included in each building element; and a device for the take-off of the materials and cost, wherein the device for selecting a composite material code and linking the same links the position and shape of an object as a single information by transferring the handle value of a polyline entity of the closed curve from room name code entity data to extended data.

2. A method for the take-off of the materials using a two-dimensional CAD interface, comprising the steps of:

extracting position information for building elements for each building, floor, and room included in a CAD drawing, and correcting and supplementing an entity of the drawing with reference to project information corresponding to the CAD drawing;

extracting object shape information for building elements for each building, floor, and room having the taken-off position information and linking the position information of an object with the shape information, wherein the step of taking-off object shape information comprises the steps of:

entering the code of surface data included in the CAD drawing and calculating area data;

entering the code of line data and calculating horizontal and longitudinal lengths;

entering the code of portion data in order to calculate a bill of materials; and taking-off shape information by generating a closed curve with center on an object reference line for building elements for each building, floor, and room by the area data, horizontal and longitudinal length data, and portion data, wherein, in the step of linking the position information and shape information for an object, the position and shape of an object are linked with each other as single information by transferring a handle value of a polyline entity of the closed curve to the extended data in room name code entity data;

selecting a composite material code for materials included in the building elements and integrating the composite material code for the position information and shape information as a finish number; and taking-off of the material and cost information for each building element with reference to the selected material code.

* * * * *